US012737390B1

(12) United States Patent
Weidner et al.

(10) Patent No.: US 12,737,390 B1
(45) Date of Patent: Sep. 15, 2026

(54) SEARCH LABELING SYSTEM FOR ENHANCED CONTENT INDEXING AND RETRIEVAL

(71) Applicant: Notion Labs, Inc., San Francisco, CA (US)

(72) Inventors: Matthew Weidner, San Francisco, CA (US); Stephan Boyer, San Francisco, CA (US); Michael Kuo, Long Island City, NY (US); Benjamin Schley Hughes, Brooklyn, NY (US); Fabricio Pontes Harsich, San Francisco, CA (US); Emma Yuchen Guo, San Francisco, CA (US)

(73) Assignee: Notion Labs, Inc., San Francisco, CA (US)

( * ) Notice: Subject to any disclaimer, the term of this patent is extended or adjusted under 35 U.S.C. 154(b) by 0 days.

(21) Appl. No.: 19/547,620

(22) Filed: Feb. 23, 2026

Related U.S. Application Data

(60) Provisional application No. 63/891,938, filed on Oct. 1, 2025.

(51) Int. Cl.
*G06F 16/31* (2019.01)
*G06F 16/334* (2025.01)

(52) U.S. Cl.
CPC .......... *G06F 16/322* (2019.01); *G06F 16/334* (2019.01)

(58) Field of Classification Search
CPC ....... G06F 16/322; G06F 16/334; G06F 16/31
See application file for complete search history.

(56) References Cited

U.S. PATENT DOCUMENTS 11,558,192 B2 * 1/2023 Auh ........................ H04L 9/085
2020/0389521 A1 * 12/2020 Brock ........................ H04L 9/50
2021/0224253 A1 * 7/2021 Shrinivasan ........ G06F 16/2255
2026/0046317 A1 * 2/2026 Crabtree ............... H04L 63/104

FOREIGN PATENT DOCUMENTS

DE 102023114763 A1 * 2/2024 ........... G06F 40/166

* cited by examiner

*Primary Examiner* — Kuen S Lu
(74) *Attorney, Agent, or Firm* — Dorsey & Whitney LLP

(57) ABSTRACT

A system creates a block within a digital workspace. The block includes text that is assigned a text instance identifier (ID). The system can store a single conflict-free replicated data type (CRDT) text slice tree for the block, where each node represents a text slice corresponding to a segment of the text. A database table can store the text instance ID and a search label for each text slice. The system can, in response to a text editing operation, segment the text into two contiguous text slices, represented as first and second child nodes of the text slice tree, and assign a child search label that comprises a parent search label appended with different characters. A combination of the text instance ID and a search label uniquely identifies a text slice in the digital workspace.

19 Claims, 8 Drawing Sheets

500

Create block within digital workspace that includes multiple blocks
502

Store single text slice tree in database record and link the text slice tree to the block
504

In response to text editing operation:

- Segment text into text slices, represented as child nodes in text slice tree,
- Create child search labels for the child nodes to each include parent search labels as a prefix and appended with different characters, and
- Store the child search labels in the database table.

SEARCH LABELING SYSTEM FOR ENHANCED CONTENT INDEXING AND RETRIEVAL

CROSS-REFERENCE TO RELATED APPLICATIONS

This application claims the benefit of U.S. Provisional Patent Application No. 63/891,938, filed Oct. 1, 2025, entitled "CONFLICT-FREE REPLICATED DATA TYPE (CRDT) SEARCH LABELING SYSTEM FOR ENHANCED CONTENT INDEXING AND RETRIEVAL," which is incorporated herein by reference in its entirety.

BACKGROUND

Workspaces (e.g., digital workspaces) refer to environments that assemble tools and platforms that allow users to work, communicate, and produce work products together. Workspaces can be desktop or web-based applications that allow multiple users to share and access the workspaces in a variety of manners. Workspaces can include compilations of electronic documents that can be organized within the workspace.

BRIEF DESCRIPTION OF THE DRAWINGS

Reference will now be made, by way of example, to the accompanying drawings, which show example embodiments of the present application and in which:

FIG. 5 is a flowchart that illustrates a process for using search labels to enable asynchronous, block-based editing across multiple clients collaborating on a workspace.

Figure 1:
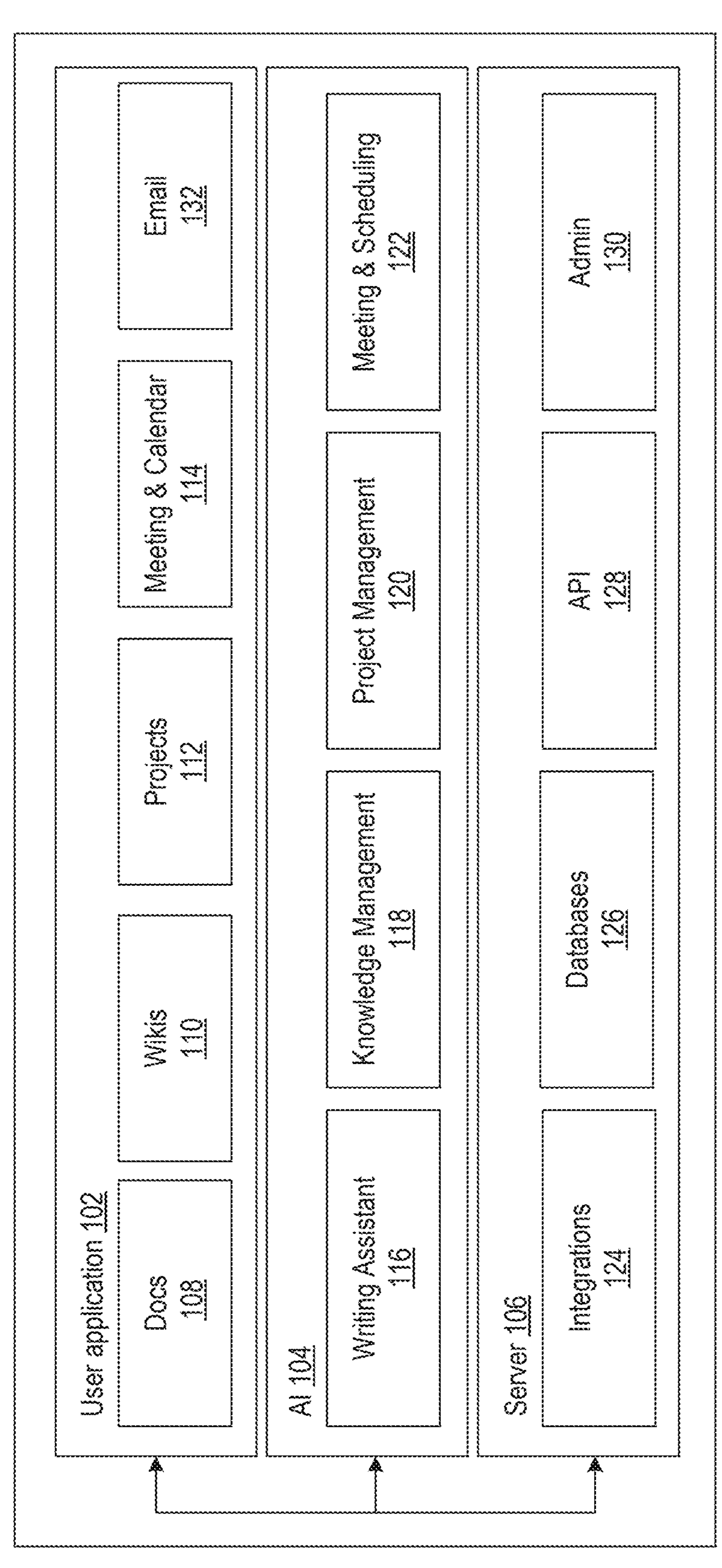
FIG. 1 is a block diagram illustrating a platform, which may be used to implement examples of the present disclosure.

The technologies described herein will become more apparent to those skilled in the art by studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The present technology includes a search labeling system ("system") that enhances indexing, retrieval, and management of content within a collaborative digital workspace. The system can operate on a block-based editor model, such as Notion, where content is contained in blocks that can represent logical units such as paragraphs, list items, or table rows. Data synchronization uses conflict-free replicated data types (CRDTs) to ensure real-time and offline-resilient consistency across distributed user sessions where users perform text editing operations on common blocks.

Each block is a discrete unit of content, which may include text, media, or embedded objects. Each block is associated with a single text slice tree, which is a hierarchical data structure where each node, or "text slice," represents a region of the block's text, which could be created by splitting text. Text slices collectively form an ordered representation of the block's rendered content, reconstructed through pre-order tree traversal. Each text slice can also have metadata including format, attribution, originating block information, version information, operational history, and/or a unique CRDT instance identifier.

A text slice tree of a block organizes the block's content into one or more text slices. Each text slice contains, at minimum, the text that will be rendered for the block. Each slice may contain any combination of characters, words, sentences, paragraphs, or non-semantic text regions, along with its metadata. The text slice tree is stored as a searchable database record linked to the block, and each labeled text slice, along with its metadata and operational history, is recorded in a searchable database table of the database that administers the digital workspace. The complete rendered text for a block can be obtained by pre-order traversal of the text slice tree. In one example, a complete rendered text for a block is obtained by performing a pre-order traversal of text slices in the tree, visiting the node, then visiting its left child, and then visiting its right child.

When a block is created, a new text instance with a unique text instance identifier (ID) is instantiated. The text instance ID uniquely identifies the underlying text CRDT. All text that is newly inserted in the block (not from a split) belongs to the text instance of the block, even if the text gets moved to other blocks, for example. As used herein, "text instance" is a CRDT instance (also referred to herein as a "text CRDT instance") that could refer to a type of data instance that encompasses data other than text. All text editing operations (e.g., splitting, merging, or moving slices) are trackable through these identifiers. The text instance could refer to a conceptual instance identified by a text instance ID. A "text slice" is a segment of a text instance, corresponding to at least a portion of the text CRDT array. Multiple text slices within the same text instance are non-overlapping, except in the case of a split character, which is duplicated in both resulting slices.

The system supports collaborative editing by leveraging CRDTs. A CRDT, as referred to herein, is a data structure replicated across nodes in a distributed network. Applications can update a CRDT replica independently and concurrently, without coordination. An algorithm automatically resolves inconsistencies, ensuring that replicas eventually reach the same state. CRDT tree structure enables collaborative editing operations essential for block-based text editors, including splitting, merging, and moving text slices between blocks. Because the text slice tree for each block is stored as a database record, the system preserves user intent and maintains data consistency across collaborative sessions. The CRDT ensures that all replicas eventually converge to the same state, preventing data loss or duplication, even during offline use or merge conflicts.

The system assigns "search labels," which could be persistent alphanumeric string identifiers, to individual text slices within a block. These search labels can be text strings, keywords, tags, numbers, or any combination of characters. Unlike other systems that associate labels with static positions in a workspace or document, each search label is directly linked to its corresponding text slice. As blocks are edited, whether through splitting, merging, formatting, or moving slices, the associated search labels migrate with their respective slices. This ensures that even as the underlying text changes due to user actions, artificial intelligence (AI) agent ("agent") actions, or programmatic actions, the connection between each search label and its text slice remains intact.

Search labels are stored as metadata within the text slice data structure. Whenever a text slice is split, edited, or reformatted, the label is automatically propagated to all descendant slices created by these actions. When two blocks are merged, the text slices from one block are moved into the other block while retaining their respective search labels. This mechanism guarantees that the association between a search label and its designated portion of content persists, regardless of the sequence of edits or asynchronous modifications made by multiple entities. For instance, if two users edit overlapping segments of labeled content at the same time, the system leverages both the search labels and the operational history embedded in the CRDT slices to accurately resolve the final content and preserve correct label distribution. By utilizing search labels in this way, the system enables efficient indexing and retrieval of specific content segments within a workspace or document, even in environments with extensive collaborative editing or merge conflicts.

Search labels can be used to readily identify which text slices have been modified, facilitating precise content management even for text operations performed offline by users or agents. For example, actions performed offline are assigned provisional identifiers to maintain consistency. The provisional identifiers are then used to reconcile text operations performed offline on a common text instance when clients return online. AI tools can also interact with blocks and slices, reading, modifying, or generating new data. For instance, an AI agent might alter text contained within a block, with all changes recorded as CRDT operations in the slice tree. These modifications, whether made by multiple AI agents or human users working concurrently, can be accurately merged, preserving the integrity of both the content and its associated labels.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Block Data Model

The disclosed technology includes a block data model ("block model"). The blocks are dynamic units of information that can be transformed into other block types and move across workspaces. The block model allows users to customize how their information is moved, organized, and shared. Hence, blocks contain information but are not siloed.

Blocks are singular pieces that represent all units of information inside an editor. In one example, text, images, lists, a row in a database, etc., are all blocks in a workspace. The attributes of a block determine how that information is rendered and organized. Every block can have attributes including an identifier (ID), properties, and type. Each block is uniquely identifiable by its ID. The properties can include a data structure containing custom attributes about a specific block. An example of a property is "title," which stores text content of block types such as paragraphs, lists, and the title of a page. More elaborate block types require additional or different properties, such as a page block in a database with user-defined properties. Every block can have a type, which defines how a block is displayed and how the block's properties are interpreted.

A block has attributes that define its relationship with other blocks. For example, the attribute "content" is an array (or ordered set) of block IDs representing the content inside a block, such as nested bullet items in a bulleted list or the text inside a toggle. The attribute "parent" is the block ID of a block's parent, which can be used for permissions. Blocks can be combined with other blocks to track progress and hold all project information in one place.

A block type is what specifies how the block is rendered in a user interface (UI), and the block's properties and content are interpreted differently depending on that type. Changing the type of a block does not change the block's properties or content—it only changes the type attribute. The information is thus rendered differently or even ignored if the property is not used by that block type. Decoupling property storage from block type allows for efficient transformation and changes to rendering logic and is useful for collaboration.

Blocks can be nested inside of other blocks (e.g., infinitely nested sub-pages inside of pages). The content attribute of a block stores the array of block IDs (or pointers) referencing those nested blocks. Each block defines the position and order in which its content blocks are rendered. This hierarchical relationship between blocks and their render children is referred to herein as a "render tree." In one example, page blocks display their content in a new page, instead of rendering it indented in the current page. To see this content, a user would need to click into the new page.

In the block model, indentation is structural (e.g., reflects the structure of the render tree). In other words, when a user indents something, the user is manipulating relationships between blocks and their content, not just adding a style. For example, pressing Indent in a content block can add that block to the content of the nearest sibling block in the content tree.

Blocks can inherit permissions of blocks in which they are located (which are above them in the tree). Consider a page: to read its contents, a user must be able to read the blocks within that page. However, there are two reasons one cannot use the content array to build the permissions system. First, blocks are allowed to be referenced by multiple content arrays to simplify collaboration and a concurrency model. But because a block can be referenced in multiple places, it is ambiguous which block it would inherit permissions from. The second reason is mechanical. To implement permission checks for a block, one needs to look up the tree, getting that block's ancestors all the way up to the root of the tree (which is the workspace). Trying to find this ancestor path by searching through all blocks' content arrays is inefficient, especially on the client. Instead, the model uses an "upward pointer"—the parent attribute—for the permission system. The upward parent pointers and the downward content pointers mirror each other.

A block's life starts on the client. When a user takes an action in the interface—typing in the editor, dragging blocks around a page—these changes are expressed as operations that create or update a single record. The "records" refer to persisted data, such as blocks, users, workspaces, etc. Because many actions usually change more than one record, operations are batched into transactions that are committed (or rejected) by the server as a group.

Creating and updating blocks can be performed by, for example, pressing Enter on a keyboard. First, the client defines all the initial attributes of the block, generating a new unique ID, setting the appropriate block type (to_do), and filling in the block's properties (an empty title, and checked: [["No"]]). The client builds operations to represent the creation of a new block with those attributes. New blocks are not created in isolation: blocks are also added to their parent's content array, so they are in the correct position in the content tree. As such, the client also generates an operation to do so. All these individual change operations are grouped into a transaction. Then, the client applies the operations in the transaction to its local state. New block objects are created in memory and existing blocks are modified. In native apps, the model caches all records that are accessed locally in an LRU (least recently used) cache on top of SQLite or IndexedDB, referred to as RecordCache. When records are changed on a native app, the model also updates the local copies in RecordCache. The editor re-renders to draw the newly created block onto the display. At the same time, the transaction is saved into TransactionQueue, the part of the client responsible for sending all transactions to the model's servers so that the data is persisted and shared with collaborators. TransactionQueue stores transactions safely in IndexedDB or SQLite (depending on the platform) until they are persisted by the server or rejected.

A block can be saved on a server to be shared with others. Usually, TransactionQueue sits empty, so the transaction to create the block is sent to the server in an application programming interface (API) request. In one example, the transaction data is serialized to JSON and posted to the/saveTransactions API endpoint. SaveTransactions gets the data into source-of-truth databases, which store all block data as well as other kinds of persisted records. Once the request reaches the API server, all the blocks and parents involved in the transaction are loaded. This gives a "before" picture in memory. The block model duplicates the "before" data that had just been loaded in memory. Next, the block model applies the operations in the transaction to the new copy to create the "after" data. Then the model uses both "before" and "after" data to validate the changes for permissions and data coherency. If everything checks out, all created or changed records are committed to the database-meaning the block has now officially been created. At this point, a "success" HTTP response to the original API request is sent by the client. This confirms that the client knows the transaction was saved successfully and that the client can move on to saving the next transaction in the TransactionQueue. In the background, the block model schedules additional work depending on the kind of change made for the transaction. For example, the block model can schedule version history snapshots and indexing block text for a Quick Find function. The block model also notifies MessageStore, which is a real-time updates service, about the changes that were made.

The block model provides real-time updates to, for example, almost instantaneously show new blocks to members of a teamspace. Every client can have a long-lived WebSocket connection to the MessageStore. When the client renders a block (or page, or any other kind of record), the client subscribes to changes of that record from MessageStore using the WebSocket connection. When a team member opens the same page, the member is subscribed to changes of all those blocks. After changes have been made through the saveTransactions process, the API notifies MessageStore of new recorded versions. MessageStore finds client connections subscribed to those changing records and passes on the new version through their WebSocket connection. When a team member's client receives version update notifications from MessageStore, it verifies that version of the block in its local cache. Because the versions from the notification and the local block are different, the client sends a syncRecordValues API request to the server with the list of outdated client records. The server responds with the new record data. The client uses this response data to update the local cache with the new version of the records, then re-renders the user interface to display the latest block data.

Blocks can be shared instantaneously with collaborators. In one example, a page is loaded using only local data. On the web, block data is pulled from being in memory. On native apps, loading blocks that are not in memory are loaded from the RecordCache persisted storage. However, if missing block data is needed, the data is requested from an API. The API method for loading the data for a page is referred to herein as loadPageChunk; it descends from a starting point (likely the block ID of a page block) down the content tree and returns the blocks in the content tree plus any dependent records needed to properly render those blocks. Several layers of caching for loadPageChunk are used, but in the worst case, this API might need to make multiple trips to the database as it recursively crawls down the tree to find blocks and their record dependencies. All data loaded by loadPageChunk is put into memory (and saved in the RecordCache if using the app). Once the data is in memory, the page is laid out and rendered using React.

Software Platform

FIG. 1 is a block diagram of an example platform 100. The platform 100 provides users with an all-in-one workspace for data and project management. The platform 100 can include a user application 102, an AI tool 104, and a server 106. The user application 102, the AI tool 104, and the server 106 are in communication with each other via a network.

In some implementations, the user application 102 is a cross-platform software application configured to work on several computing platforms and web browsers. The user application 102 can include a variety of templates. A template refers to a prebuilt page that a user can add to a workspace within the user application 102. The templates can be directed to a variety of functions. Exemplary templates include a docs template 108, a wikis template 110, a projects template 112, a meeting and calendar template 114, and an email template 132. In some implementations, a user can generate, save, and share customized templates with other users.

The user application 102 templates can be based on content "blocks." For example, the templates of the user application 102 include a predefined and/or pre-organized set of blocks that can be customized by the user. Blocks are content containers within a template that can include text, images, objects, tables, maps, emails, and/or other pages (e.g., nested pages or sub-pages). Blocks can be assigned to certain properties. The blocks are defined by boundaries having dimensions. The boundaries can be visible or non-visible for users. For example, a block can be assigned as a text block (e.g., a block including text content), a heading block (e.g., a block including a heading), or a sub-heading block having a specific location and style to assist in organizing a page. A block can be assigned as a list block to include content in a list format. A block can be assigned as an AI prompt block (also referred to as a "prompt block") that enables a user to provide instructions (e.g., prompts) to the AI tool 104 to perform functions. A block can also be assigned to include audio, video, or image content.

A user can add, edit, and remove content from the blocks. The user can also organize the content within a page by moving the blocks around. In some implementations, the blocks are shared (e.g., by copying and pasting) between the different templates within a workspace. For example, a block embedded within multiple templates can be configured to show edits synchronously.

The docs template 108 is a document generation and organization tool that can be used for generating a variety of documents. For example, the docs template 108 can be used to generate pages that are easy to organize, navigate, and format. The wikis template 110 is a knowledge management application having features similar to the pages generated by the docs template 108 but that can additionally be used as a database. The wikis template 110 can include, for example, tags configured to categorize pages by topic and/or can include an indication of whether the provided information is verified to indicate its accuracy and reliability. The projects template 112 is a project management and note-taking software tool. The projects template 112 can allow the users, either as individuals or as teams, to plan, manage, and execute projects in a single forum. The meeting and calendar template 114 is a tool for managing tasks and timelines. In addition to traditional calendar features, the meeting and calendar template 114 can include blocks for categorizing and prioritizing scheduled tasks, generating to-do and action item lists, tracking productivity, etc. The various templates of the user application 102 can be included under a single workspace and include synchronized blocks. For example, a user can update a project deadline on the projects template 112, which can be automatically synchronized to the meeting and calendar template 114. The various templates of the user application 102 can be shared within a team, allowing multiple users to modify and update the workspace concurrently.

The email template 132 allows the users to customize their inbox by representing the inbox as a customizable database where the user can add custom columns and create custom views with layouts. One view can include multiple layouts including a calendar layout, a summary layout, and an urgent information layout. Each view can include a customized structure including custom criteria, custom properties, and custom actions. The custom properties can be specific to a view such as AI-extracted properties and/or heuristic-based properties. The custom actions can trigger automatically when a message enters the view. The custom actions can include deterministic rules like "Archive this," or assistant workflows like responding to support messages by searching user applications 102 or filing support tickets. In addition, the view can include actions, such as buttons, that are custom to the view and perform operations on the messages in the inbox. Only the customized structure can be shared with other users of the system, or both the customized structure and the messages can be shared.

The integration of the docs template 108, the wikis template 110, the projects template 112, the meeting and calendar template 114, and the email template 132 enables linking and embedding of templates within other templates. For example, an email sent from an email address within the platform 100 to another email address within the platform 100 can include an embedding of a document within the platform 100, or an embedding of a block within the document. In another example, a wiki can link to a meeting within the calendar.

The AI tool 104 is an integrated AI assistant that enables AI-based functions for the user application 102. In one example, the AI tool 104 is based on a neural network architecture, such as a transformer of an artificial intelligence (AI) system. The AI tool 104 can interact with blocks embedded within the templates on a workspace of the user application 102. For example, the AI tool 104 can include a writing assistant tool 116, a knowledge management tool 118, a project management tool 120, and a meeting and scheduling tool 122. The different tools of the AI tool 104 can be interconnected and interact with different blocks and templates of the user application 102.

The writing assistant tool 116 can operate as a generative AI tool for creating content for the blocks in accordance with instructions received from a user. Creating the content can include, for example, summarizing, generating new text, or brainstorming ideas. For example, in response to a prompt received as a user input that instructs the AI to describe what the climate is like in New York, the writing assistant tool 116 can generate a block including text that describes the climate in New York. As another example, in response to a prompt that requests ideas on how to name a pet, the writing assistant tool 116 can generate a block including a list of creative pet names. The writing assistant tool 116 can also operate to modify existing text. For example, the writing assistant can shorten, lengthen, or translate existing text, correct grammar and typographical errors, or modify the style of the text (e.g., a social media style versus a formal style).

The knowledge management tool 118 can use AI to categorize, organize, and share knowledge included in the workspace. In some implementations, the knowledge management tool 118 can operate as a question-and-answer assistant. For example, a user can provide instructions on a prompt block to ask a question. In response to receiving the question, the knowledge management tool 118 can provide an answer to the question, for example, based on information included in the wikis template 110. The project management tool 120 can provide AI support for the projects template 112. The AI support can include autofilling information based on changes within the workspace or automatically tracking project development. For example, the project management tool 120 can use AI for task automation, data analysis, real-time monitoring of project development, allocation of resources, and/or risk mitigation. The meeting and scheduling tool 122 can use AI to organize meeting notes, unify meeting records, list key information from meeting minutes, and/or connect meeting notes with deliverable deadlines.

The server 106 can include various units (e.g., including compute and storage units) that enable the operations of the AI tool 104 and workspaces of the user application 102. The server 106 can include an integrations unit 124, databases 126, an API 128, and an administration (admin) unit 130. The databases 126 are configured to store data associated with the blocks. The data associated with the blocks can include information about the content included in the blocks, the function associated with the blocks, and/or any other information related to the blocks. The API 128 can be configured to communicate the block data between the user application 102, the AI tool 104, and the databases 126. The API 128 can also be configured to communicate with remote server systems, such as AI systems. For example, when a user performs a transaction within a block of a template of the user application 102 (e.g., in a docs template 108), the API 128 processes the transaction and saves the changes associated with the transaction to the database 126. The integrations unit 124 is a tool connecting the platform 100 with external systems and software platforms. Such external systems and platforms can include other databases (e.g., cloud storage spaces), messaging software applications, or audio or video conference applications. The administration unit 130 is configured to manage and maintain the operations and tasks of the server 106. For example, the administration unit 130 can manage user accounts, data storage, security, performance monitoring, etc.

Hierarchical Organizational Blocks in a Workspace

Figure 2:
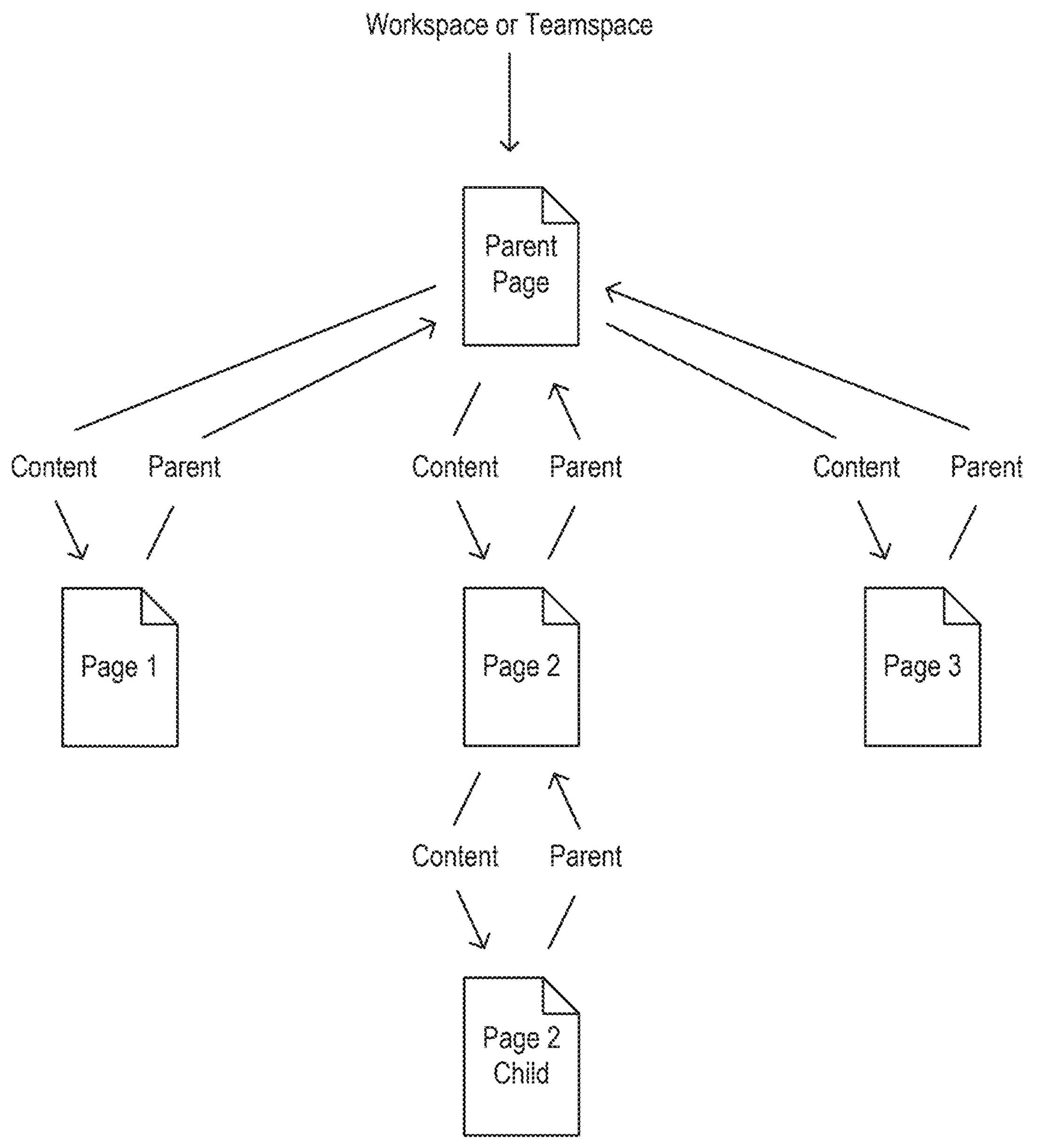
FIG. 2 is a block diagram illustrating a hierarchical organization of pages in a workspace.

FIG. 2 is a block diagram illustrating a hierarchical organization of pages in a workspace. As described with respect to the block data model of the present technology, a workspace can include multiple pages (e.g., page blocks). The pages (e.g., including parent pages and child or nested pages) can be arranged hierarchically within the workspace or one or more teamspaces, as shown in FIG. 2. The page can include a block such as tabs, lists, images, tables, etc.

A teamspace can refer to a collaborative space associated with a team or an organization that is hierarchically below a workspace. For example, a workspace can include a teamspace accessible by all users of an organization and multiple teamspaces that are accessible by users of different teams. Accessibility generally refers to creating, editing, and/or viewing content (e.g., pages) included in the workspace or the one or more teamspaces.

In the hierarchical organization illustrated in FIG. 2, a parent page (e.g., "Parent Page") is located hierarchically below the workspace or a teamspace. The parent page includes three children pages (e.g., "Page 1," "Page 2," and "Page 3"). Each of the child pages can further include sub-pages (e.g., "Page 2 Child," which is a grandchild of "Parent Page" and child of "Page 2"). The "Content" arrows in FIG. 2 indicate the relationship between the parents and children while the "Parent" arrows indicate the inheritance of access permissions. The child pages inherit access permission from the (immediate) parent page under which they are located hierarchically (e.g., which is above them in the tree). For example, "Page 2" inherited the access permission of "Parent Page" as a default when it was created under its parent page. Similarly, "Page 2 Child" inherited the access permission of the parent page as a default when it was created under its parent page. "Parent Page," "Page 2," and "Page 2 Child" thereby have the same access permission within the workspace.

The relationships and organization of the content can be modified by changing the location of the pages. For example, when a child page is moved to be under a different parent, the child page's access permission modifies to correspond to the access permission of the new parent. Also, when the access permission of "Parent Page" is modified, the access permission of "Page 1," "Page 2," and "Page 3" can be automatically modified to correspond to the access permission of "Parent Page" based on the inheritance character of access permissions.

In contrast, however, a user can modify the access permission of the children independently of their parents. For example, the user can modify the access permission of "Page 2 Child" in FIG. 2 so that it is different from the access permission of "Page 2" and "Parent Page." The access permission of "Page 2 Child" can be modified to be broader or narrower than the access permission of its parents. As an example, "Page 2 Child" can be shared on the internet while "Page 2" is only shared internally to the users associated with the workspace. As another example, "Page 2 Child" can be shared only with an individual user while "Page 2" is shared with a group of users (e.g., a team of the organization associated with the workspace). In some implementations, the hierarchical inheritance of the access permissions described herein can be modified from the previous description. For example, the access permissions of all the pages (parent and children) can be defined as independently changeable.

Text Slice Trees

When a user creates a new block in the workspace, the system automatically initializes a corresponding text slice tree for that block. The text slice tree starts with a single root node containing a text slice that represents the entire content of a new text instance. The text of the block is assigned a text instance ID that is unique among other blocks. At initialization, the root text slice encompasses an entirety of the text (e.g., all characters) of the block's content. This design ensures a direct, one-to-one mapping between the block's initial state and its text content, establishing a clear hierarchy due to all subsequent editing operations.

As users interact with a block, such as by typing, inserting line breaks, or performing other edits, the system dynamically subdivides text slices to reflect these changes. For example, when a user places the cursor within a block and presses the Enter key, the system inserts a special split character at the cursor's location within the relevant text slice. The original text slice is then divided into two distinct slices: the left segment (preceding the cursor) remains in the original block's text slice tree, while the right segment (following the cursor) is moved to a newly created block. The new block's text slice tree is initialized with this right segment as its root node. This approach supports intuitive editing and enables the tree structure to represent multi-level hierarchies, as the moved slice may itself contain child nodes.

The system also supports merging blocks, which can occur when users delete boundaries between adjacent blocks. For instance, if a user places the cursor at the beginning of a second block and presses Backspace, the nodes from the second block's text slice tree are transferred into the first block's tree. Typically, these nodes are attached as children to the rightmost leaf node in the first block's tree. To maintain structural consistency, the root node of the second block may be split, with its content and children reassigned as needed before the merge. After merging, the second block is marked as deleted, ensuring that each block maintains a single, coherent text slice tree. That is, an indication of the deletion is stored in the searchable database table rather than the block and every instance of its prior existence being deleted.

Text slice trees can handle complex editing scenarios, such as splitting a block that contains a multi-level tree of text slices. When a user initiates a split within a text slice that has its own subtree (e.g., child nodes), the system inserts a split character at the cursor location and divides the text slice into left and right segments. The left segment retains the content before the cursor, while the right segment contains the content after the cursor. All child nodes of the original text slice are reparented to the right segment, which then becomes a child of the left segment. The right segment, along with its subtree, is moved to the text slice tree of a new block. This process ensures that the rendered text, determined by pre-order traversal, remains consistent with user expectations, as all content after the cursor (including descendants) is correctly relocated.

Utilizing a tree structure for text slices, rather than a flat array or independent CRDT per block, offers significant advantages for managing concurrent operations. The tree structure enables the system to efficiently handle simultaneous splits and merges, preventing issues such as duplicated or lost text that can occur in other implementations. During collaborative editing, the tree ensures that insertions, deletions, and formatting changes are accurately reflected in the correct context, even when multiple users are making changes at the same time. This design also streamlines the process of locating and referencing specific characters, as each character is uniquely identified within its text instance and efficiently mapped to its containing block.

Search Labels

Search labels are introduced as a mechanism to optimize the retrieval of data blocks and the application of text editing operations based on CRDTs. Collaborative text editing operations such as splitting, merging, reordering, and offline operations are supported with search labels. For example, when splitting blocks, a split character is inserted to divide an existing text slice into two child slices, typically moving one to a new or different block. The tree structure and CRDT metadata preserve the logical ordering and historical intent. To merge blocks, boundaries between blocks are deleted, appending slices from one block to another with proper reparenting in the text slice tree and preservation of operational history. When reordering text slices or performing hierarchical manipulation, blocks and slices can be moved, reordered, or nested arbitrarily within the workspace's structural hierarchy, affording document organization and granular edit history. Lastly, operations performed offline are temporarily assigned provisional identifiers and later reconciled using CRDT operational logs and search label resolution upon reconnection.

More specifically, the disclosed technology attaches persistent search labels to individual text slices. As introduced earlier, a search label is a string (or optionally a compact binary encoding) uniquely identifying the history and position of a slice within its text instance. Upon each split operation, the parent's label is appended with a new token (e.g., "L" for left, "R" for right) to ensure all descendants are easily referenceable. For example, a slice labeled"", upon splitting, yields left and right children labeled "L" and "R". Further splits recursively append new characters to these base labels (e.g., splitting "R" into "RL" and "RR"). This append-only history allows for efficient and unambiguous range or prefix queries, as text instance identifiers and search label prefixes act as composite keys. In other words, text slices can be searched based on a combination of text instance IDs and search label prefixes.

The label propagation mechanism guarantees that any modification (e.g., split, merge, edit, or move) preserves the association between a search label and its logical content. If multiple users asynchronously edit a common labeled segment, the system resolves label and content histories with CRDT-based operational logs and the provenance encoded in search labels and text instance IDs.

Each labeled text slice, along with its metadata and operational history, is recorded in a searchable database table. To locate data, the system can support various search and operational mechanisms including a prefix search, merge-aware search, deletion, and annotation and ownership tracking. For example, prefix search enables locating an exact text slice by querying for the combination of its text instance ID and search label or using a range of prefix logic to identify all relevant descendants. A merge-aware search handles asynchronous splits where a single search label prefix matches multiple currently active slices in different blocks.

When a block is deleted by a user, the block content, CRDT history (including "tombstones" metadata for deleted characters), and search label records are retained, enabling potential restoration and maintaining system consistency. A permanent deletion, by contrast, fully purges the block's data, metadata CRDT history and associated search label records from all storage systems, leaving residual references. The system also provides annotation and ownership tracking where search queries enable grouping by editorial ownership or annotation tags, powering advanced features such as audit trails or programmatic content review. As such, the CRDT system is built with resilience to search labels and blocks missing due to deletions. The search labels themselves imply order, so even when only a subset of the original search labels and blocks are known, the system can handle user operations.

Thus, beyond performance improvements, search labels work in conjunction with CRDT model's handling of character and block deletions. One approach is to retain the tombstones for all characters that were deleted within a block, ensuring that the system can track deletions without losing consistency required for applying further concurrent edits. A "tombstone," as used herein, refers to an indication or placeholder that remains after text content is deleted within a block. This approach is useful in collaborative editing because tombstones help notify all users and devices that a portion of the document was deleted, so their versions of the document stay in sync. Tombstones also help prevent mistakes, like new text accidentally being added where content was meant to be erased. While this may result in tombstones persisting indefinitely and slices in deleted blocks becoming "zombies" (visible to offline clients but recognized as deleted by the server), it preserves the integrity of the data model.

Another approach involves moving slices out of deleted blocks if those slices belong to text instances that span other blocks. In this case, the system clears and relocates the affected slices to surviving blocks, maintaining tombstones for deleted items. This simplifies the data model and avoids special cases but may lead to the accumulation of empty slices and requires management of slice relocation. A third approach is to reject operations on target slices that have been deleted, thereby simplifying implementation and enhancing privacy, though this may disrupt multi-step operations if only some are rejected.

In contrast, prior systems retrieve and combine all text slices associated with a text instance before applying any operation. This approach is inefficient and problematic, particularly when some blocks have been deleted, as it becomes impossible to combine all slices, leading to operational failures. Furthermore, the existing systems indiscriminately load all related blocks, which is unnecessary and not optimal.

The proposed solution integrates search labels into both the data model and text operations, enabling selective retrieval of only relevant blocks for a given operation. This approach eliminates the need to combine all text slices before applying an operation and supports efficient block lookups through dedicated database routines. For example, to ensure robust support for deletions, the system must be capable of deleting blocks without compromising CRDT validity. Several design principles guide this approach, including search labels that uniquely identify a text slice within a text instance or text slices that can be split but not merged, and each CRDT operation targets a single text instance.

The design relaxes invariants of the prior system. For example, the uniqueness of item identifiers is now guaranteed only within individual slices, rather than across all slices in a text instance. Similarly, clock values across slices in a text instance may diverge, but the highest clock value within each slice is tracked. These changes allow the system to avoid loading and combining all blocks and slices, thereby improving efficiency and scalability.

Text operations are applied only to slices returned by search label queries, rather than to all slices in a text instance. If a search label query returns no results, it indicates that the block has been deleted, and the operation must handle this scenario gracefully. Even for slices containing only deleted items, search labels are preserved to maintain system integrity. The system provides optimal storage location for tombstones, handling of annotation operations when slices are split or deleted, optimization for safety of relaxing uniqueness and clock invariants, and the management of asynchronous deletions and edits by multiple collaborators.

In some embodiments, the described data structures and workflows are integrated into a digital workspace platform supporting real-time, offline, and AI-assisted operations. For example, AI agents can read or modify text slices, and all such edits propagate with search labels to retain edit histories and proper indexing. All content and structural modifications are captured as transactions, batched, and atomically committed via APIs to the authoritative database. Real-time updates are distributed through messaging infrastructures, ensuring all users observe consistent and current workspace state. Permissions and access control are inherited and may be modified along the workspace/block hierarchy, minimizing ambiguity and streamlining permission audits.

In one example, each text slice is associated with a search label, which can be an append-only string that uniquely identifies the slice within a text instance. Suppose a text instance has a single text slice:

"Thou sodden-witted lord; thou hast no more brain than I have in mine elbows."

The search label for this slice could be ""(search label empty). Now suppose there is a split:

Slice 1 ("L"): "Thou sodden-witted lord;"

Slice 2 ("R"): "thou hast no more brain than I have in mine elbows."

The search label for the first slice could be "L" (indicating the left part of the split), and the search label for the second slice could be "R" (indicating the right part of the split). Suppose the second slice is split further:

Slice 1 ("L"): "Thou sodden-witted lord;"

Slice 2 ("RL"): "thou hast no more brain than"

Slice 3 ("RR"): "I have in mine elbows."

The sodden-witted text slice is unchanged and so is its search label: "L". The second slice, which is the result of two splits, can now have a search label with two symbols: "RL". The "R" can be from the first split, and the "L" can be from the second split. The final third slice can have "RR" as its search label, indicating that it was on the right side of two splits. If the third text slice were split again, the resulting slices can have search labels "RRL" and "RRR", respectively. For each split, the search label can append another "L" or "R" at the end. As this example demonstrates, the search labels indicate both a history and a relationship among text slices.

Search labels thus provide a way to specify which text slices are being modified, so the system can locate the relevant block accordingly. This approach is especially well-suited to address asynchronous splits. Consider an example that does not utilize search labels: suppose a user types a letter into a text slice A, and in that same moment another user splits that same text slice A into B and C, somewhere before where the first user is editing. If the system processes the split before the insert, then the insert applies to text slice C, which the first user's client didn't even know about at the time it issued the operation. Now consider the same scenario with search labels. Suppose, for example, the search label for A happens to be "LR". Then the search labels for B and C can be "LRL" and "LRR", respectively. The insert operation can ask the system to look up the block containing the slice labeled "LR" (with the relevant text instance ID), which does not match either "LRL" or "LRR". However, it is a prefix of those search labels. With a prefix search, the server can load both blocks (B and C), rather than querying all the blocks for the given text instance.

In a scenario when there are no asynchronous edits to the same block, the system can have up-to-date text slices and their associated labels. In that case, a combination of a search label and text instance ID can uniquely identify a single text slice without redundant loading of blocks.

The search labels can be encoded as bit strings or text. For example, "L" becomes a 0 bit, and "R" becomes a 1 bit. In another example, search labels are encoded as text and encoded with a defined number of splits per byte (i.e., bit-packing). Each byte may be a printable ASCII character. If bit-packing is used, a lexicographical range query can be used to match the semantics of a prefix query on the bit strings that the search labels represent. That is, a bit-packing scheme can also be used to encode a designated number of splits per byte (e.g., five splits per byte), where each such byte can be a printable ASCII character. With a bit-packing approach, a simple prefix query as described above (e.g., WHERE search_label LIKE "LRL %") cannot be used. Instead, a lexicographical range query such as WHERE search_label BETWEEN low AND high can be used, where low and high can be chosen to match the semantics of doing a prefix query on the logical bit strings that the search labels represent.

Search labels can be used to infer the original order of text slices. If three slices are labeled "RL," "RR," and "L," their correct logical order is "L," "RL," "RR." This ordering signal can guide subsequent edit and split operations. Search labels can also reveal the absence of expected slices, whether due to deletions or missing records. Consider a distributed system in which a dataset is continuously repartitioned across a growing set of computers. When a client queries this evolving group, search labels enable the client to detect whether any member's response is missing, regardless of group size. For instance, if the client receives two responses labeled "L" and "RL," it can infer that an "RR" slice may be absent because "L" and "RL" do not together cover the full search-label space implied by prior splits. In another scenario, if the original label space was "L," "RL," "RRR," and "RRL," the client can still determine that the result set is incomplete, even if it cannot fully quantify the extent of what is missing.

The following example demonstrates how the described technology supports granular editing of text blocks in a collaborative digital workspace, leveraging blocks, text slice trees, and CRDT text instances. The sequence includes inserting, splitting, reordering, and merging blocks. In the example, a user initially creates a new block and enters the text "todo: milk, bread," (text instance 0). The block is split after the colon (":"), resulting in two blocks:

0 Block 0: "todo:" (text instance 0) (search label 0)

Block 1: "milk, bread," (text instance 0) (search label 1)

Each block receives its own text slice tree, initialized with the block's content as the root node. The user then splits Block 1 at the comma after "milk," producing:

Block 1a: "milk," (text instance 0) (search label 10)

Block 1b: "bread," (text instance 0) (search label 11)

The text slice of Block 1 is thus divided into two non-overlapping slices with split characters duplicated at their boundaries, and each segment is assigned to its respective block's text slice tree. The user then creates another block and enters "oat milk, tortilla," updating the workspace to:

"todo:" (text instance 0) (search label 0)

"milk," (text instance 0) (search label 10)

"oat milk, tortilla," (text instance 1) (search label empty)

"bread," (text instance 0) (search label 11)

Each block can be tracked by a text instance and associated text slice tree. The user creates another block and enters "dairy milk," updating the workspace to:

"todo:" (text instance 0) (search label 0)

"milk," (text instance 0) (search label 10)

"oat milk, tortilla," (text instance 1) (search label 0)

"dairy milk," (text instance 2) (search label empty)

"bread," (text instance 0) (search label 11)

The user then splits "oat milk, tortilla," and reorders the blocks, resulting in:

"todo:" (text instance 0) (search label 0)

"milk," (text instance 0) (search label 10)

"oat milk," (text instance 1) (search label 0)

"dairy milk," (text instance 2) (search label empty)

"bread," (text instance 0) (search label 11)

"tortilla," (text instance 1) (search label 1)

Finally, the user merges "bread," and "tortilla," to create:

"todo:" (text instance 0) (search label 0)

"milk," (text instance 0) (search label 10)

"oat milk," (text instance 1) (search label 0)

"dairy milk," (text instance 2) (search label empty)

"bread, tortilla," (text instance 0, search label 11) (text instance 1, search label 1)

Multiple users or AI agents can participate in real-time, concurrent, and/or asynchronous editing within the workspace, and the underlying tree structure and CRDT model guarantee eventual consistency. The editing operations are resolved to prevent duplication or unintended loss of content. The system's tree-based CRDT ensures that all splits, merges, moves, and re-orderings are applied in a way that preserves user intent and workspace consistency, even during simultaneous edits. For example, if one user is splitting a block while another merges it with another block, both operations are resolved so that content is neither duplicated nor lost. Using the prior example to illustrate asynchronous editing, one user merges "milk," and "oat milk," to create:

"todo:" (text instance 0) (search label 0)

"milk, oat milk," (text instance 0, search label 10) (text instance 1, search label 0)

"dairy milk," (text instance 2) (search label empty)

"bread, tortilla," (text instance 0, search label 11) (text instance 1, search label 1)

Another user merges "milk," and "dairy milk," to create:

"todo:" (text instance 0) (search label 0)

"milk, dairy milk," (text instance 0, search label 10) (text instance 2, search label empty)

"oat milk," (text instance 1) (search label 0)

"bread, tortilla," (text instance 0, search label 11) (text instance 1, search label 1)

When merged, nodes are appended as children to a leaf node, maintaining hierarchy and data consistency. Each block automatically updates its text slice tree to represent its new content. The workspace's view now includes three distinct blocks, each with individualized content and tree structure:

"todo:" (text instance 0) (search label 0)

"milk, oat milk, dairy milk," (text instances 0, search label 10) (text instance 1, search label 0) (text instance 2, search label empty)

"bread, tortilla," (text instance 0, search label 11) (text instance 1) (search label 1)

Each block is rendered on the workspace page and backed by a unique text slice tree, which records operational history, user attributions, formatting, and/or structure. The final block arrangement reflects all collaborative actions, with the text slice trees ensuring a one-to-one correspondence between visual content and persistent data.

Figure 3A:
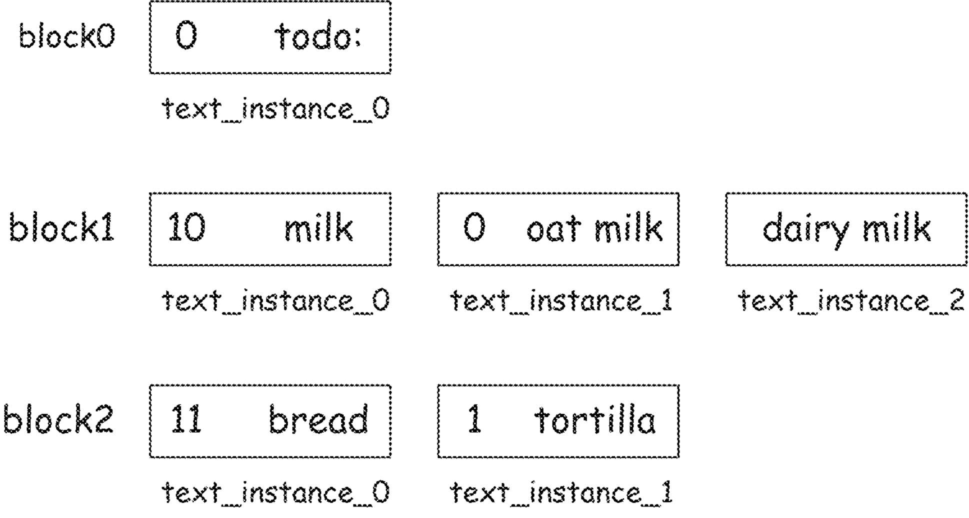
FIG. 3A illustrates the result of a sequence of edit operations on blocks of a workspace.

FIGS. 3A through 3E illustrate annotated representations of these actions. In particular, FIG. 3A illustrates the final state of the workspace of the prior example. Each rectangle represents a text slice, labeled with its rendered content, the block in which it appears, its conceptual text instance, and its search label (e.g., number values). Empty text slices are omitted for clarity. Text slices can be visualized by splits grouped by text instance (e.g., FIG. 3B) or by merges grouped by text slice tree (e.g., FIG. 3D). Organizing slices by their split relationships yields multiple linked lists, each representing a conceptual text instance. Organizing slices by their merge relationships yields multiple trees, each representing a block's current text slice tree.

Figure 3B:
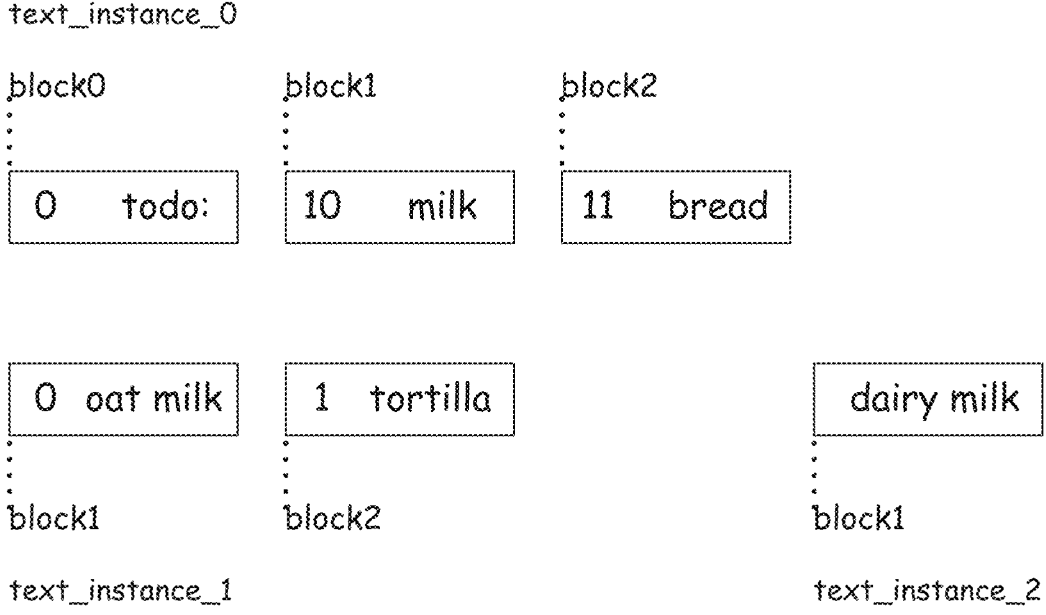
FIG. 3B is a split-first view of text slices grouped by text instance.
Figure 3C:
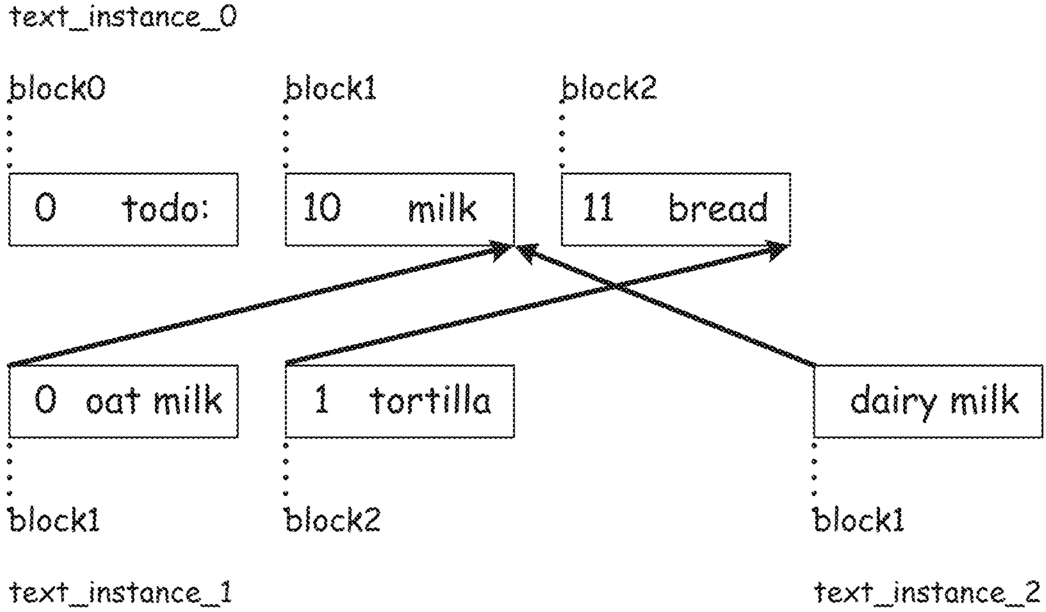
FIG. 3C is a split-first view of text slices superimposed with merges represented as arrows forming text slice trees.

FIGS. 3B and 3C illustrate split-first views, which support queries such as "get all blocks with a slice of the current text instance," handled as range queries over search labels. In particular, FIG. 3B is a split-first view of the text slices resulting from the above edits, grouped by text instance. Dotted-line boundaries correspond to splitting a slice into two slices, producing the resulting search labels. FIG. 3C is a split-first view of FIG. 3B superimposed with merges (represented as arrows) forming text slice trees.

Figure 3D:
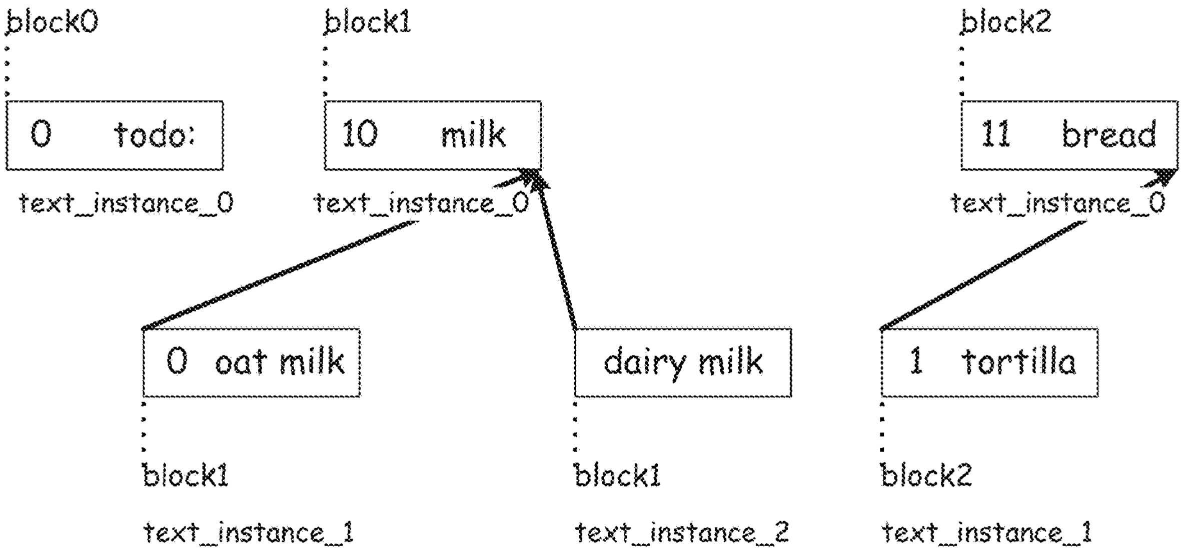
FIG. 3D is a merge-first view of text slices grouped by text slice trees.
Figure 3E:
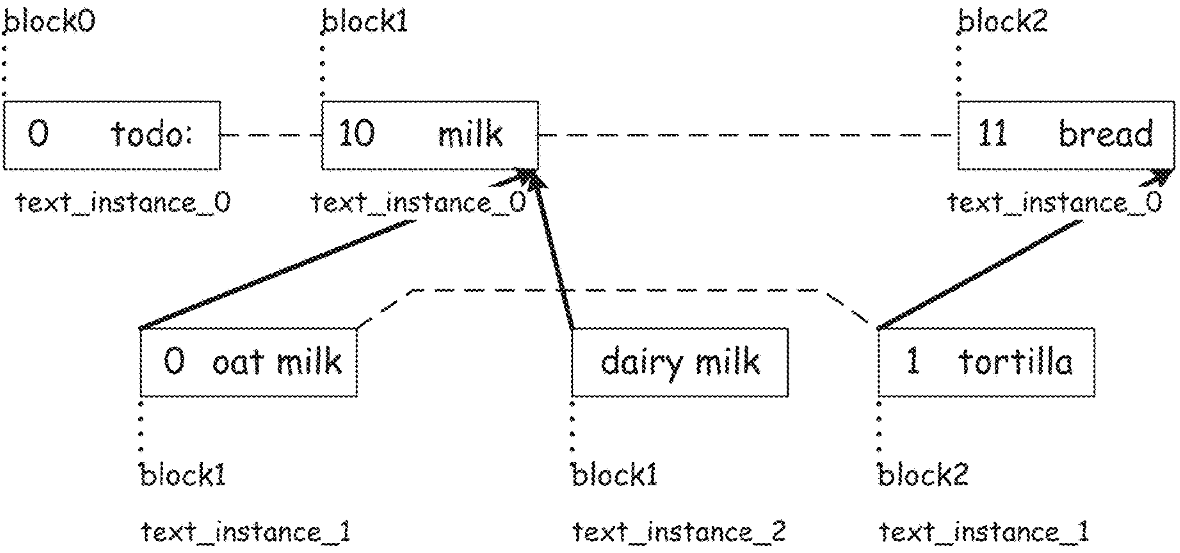
FIG. 3E is a merge-first view of text slices superimposed with splits represented as dashed lines, forming text instances.

FIGS. 3D and 3E illustrate merge-first views, which support queries such as "get all slices across text instances that are part of the current block," handled by the text slice tree of the block. In particular, FIG. 3D is a merge-first view of the text slices resulting from the above edits, grouped by text slice trees. The arrows (e.g., A→B) correspond to merging slices (e.g., merge slice A into the end of slice B). FIG. 3E illustrates a merge-first view of the resulting text slices, superimposed with splits represented as dashed lines, forming text instances.

Figure 4:
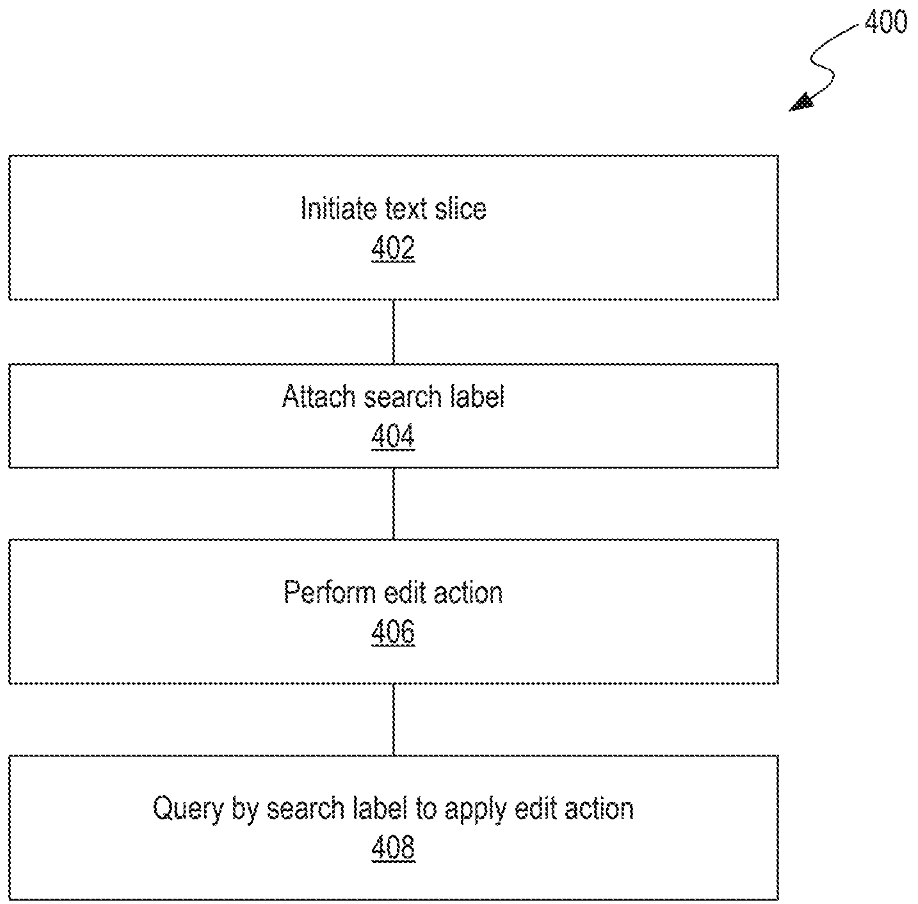
FIG. 4 is a flowchart that illustrates a process for adding and querying search labels for a workspace.

FIG. 4 is a flowchart that illustrates a process 400 for adding and querying search labels for a workspace. In one embodiment, a system generates a text slice at 402. The text slice can be a contiguous segment of document text, code, a spreadsheet cell, or other content type. The text slice can be structured as a node in a CRDT slice tree. Each text slice can comprise metadata, including a unique identifier. The unique identifier may be generated from session information, timestamps, or other universal unique identifiers. In one embodiment, multiple types of content, such as multimedia elements or embedded links and files, can be included with the CRDT instance.

At 404, the system can attach the search label to the text slice. The search label can be a persistent string identifier, such as a keyword, tag, or bit-encoded value. The search label may be stored as metadata associated with the CRDT slice. Labels can be associated with the underlying text segments. In certain embodiments, labels can be automatically generated based on contextual analysis, user input, or system-defined policies. In one example, a label is generated by use of a machine learning model. In another example, the label encodes hierarchical or positional references. In one embodiment, a label can comprise access permissions or classification attributes.

At 406, a user can perform an edit operation on the labeled text slice. The edit operation can include inserting, deleting, splitting, merging, annotating, or formatting. The edit operation can be performed concurrently by multiple users, agents, or automated processes. The search label can persist and migrate with the CRDT slice regardless of operation order. In one example, upon a labeled slice being split, the resulting slice may inherit or augment the original search label to maintain unique identification and association with the text segment. In one embodiment, concurrent edits performed offline are synchronized upon restoration of network connectivity to preserve label-to-text mapping.

At 408, the system executes a query by search label. A querying process can reference the search label to identify, index, or retrieve an associated text slice from a CRDT instance. In one embodiment, queries may be initiated by users, agents, or other external systems. Queries can be used to collect document segments sharing a given label. In one example, search queries can be used to reconstruct a history of labeled edits. In another example, queries can be used to enumerate slices to verify changes. In one embodiment, a search label can be used to locate all slices associated with a specific annotation, filter for specific types of data, or group segments by editorial ownership. In alternative embodiments, query results are presented by traversal of a CRDT slice tree.

FIG. 5 is a flowchart that illustrates a process 500 for using search labels to enable asynchronous, block-based editing across multiple clients collaborating on a workspace. In one example, a system includes a non-transitory, computer-readable storage medium including instructions recorded thereon, wherein the instructions, when executed by at least one data processor of the system, cause the system to perform the process 500.

At 502, the system creates a block within a digital workspace that includes multiple blocks. The block is a discrete unit of content including data (e.g., text) that is assigned a text instance ID. A combination of the text instance ID and a search label uniquely identifies a text slice within the workspace. The associations between search labels and text slices are preserved throughout editing operations performed on the text of the block. The system can render the block by determining an order (e.g., logical order) of text slices based on their search labels and display the text slices accordingly.

At 504, the system can store a single text slice tree in a database record and link the text slice tree to the block. The text slice tree is a CRDT instance that has a hierarchical structure in which each node represents a text slice corresponding to a segment of the text. A database table stores the text instance ID for the text and a search label for each text slice. In one example, where split operations are performed, the child text slices include the parent search label for a root node. The database table stores each search label of each text slice in the database table as metadata for the text slice, where the metadata can additionally include a combination of format, attribution, originating block, version information, operational history, and/or the unique CRDT instance identifier. In one example, each search label is encoded as a text string and can include printable ASCII characters using a bit-packing scheme that encodes multiple split operations performed on text per byte.

At 506, in response to a text editing operation to split the text of the block, the system segments the text into two contiguous text slices, represented as first and second child nodes in the text slice tree. The system propagates the parent search label to both the first and second child nodes, assigns to the first child node a first child search label that includes the parent search label as a prefix appended with a first character, and assigns to the second child node a second child search label that includes the parent search label as a prefix appended with a second character. The second character is different from the first character. The system stores the first and second child search labels in the database table. In one example of the split operation, the system inserts a split character at a position of the parent text slice where the parent text slice is to be split. The system designates a sequence of characters from a start point of the parent text slice to the split character as the first child slice and designates a sequence of characters from the split character to an end point of the parent text slice as the second child slice.

The system can initiate additional text editing operations on a target location of the text and, in response, identify the text instance ID and a target search label of a target segment, querying the database table for text slices matching the text instance ID and a target prefix of the target search label. The matching text slices are searched for the target search label to apply the text editing operation to the target text slice. The system can also merge blocks by moving text slices from a first block to a second block while retaining respective search labels and text instance IDs of the moved text slices. The system reparents a text slice tree of the first block as a child node of a last text slice in a second text slice tree of the second content block.

The system includes mechanisms to search the database for a target text slice based on the text instance ID and the search label. In one example, the system can calculate a lower bound and an upper bound based on the target search label and perform a range-based search to identify text slices having search labels within a range within the lower bound and the upper bound. In one example, the system can search the database for a target text slice and return an empty value indicative that the target text slice was once within the block but has been deleted.

The system can synchronize editing operations performed asynchronously, by distributed clients, to enable asynchronous collaborative editing without unintended data loss. For example, the system can, while a client of the workspace is offline (e.g., disconnected from a server that administers a workspace), store text editing operations performed at that client, assign a provisional identifier to the text editing operations, and, once the client of the workspace goes online (e.g., upon restoration of network connectivity between the client and the server), synchronize the offline operations by using the provisional identifier and search labels to enable resolution of edits made by multiple clients while the client was offline. That is, the system can allow a client to perform editing operations while in an offline mode and synchronize offline operations upon the client returning to an online mode.

Computer System

Figure 6:
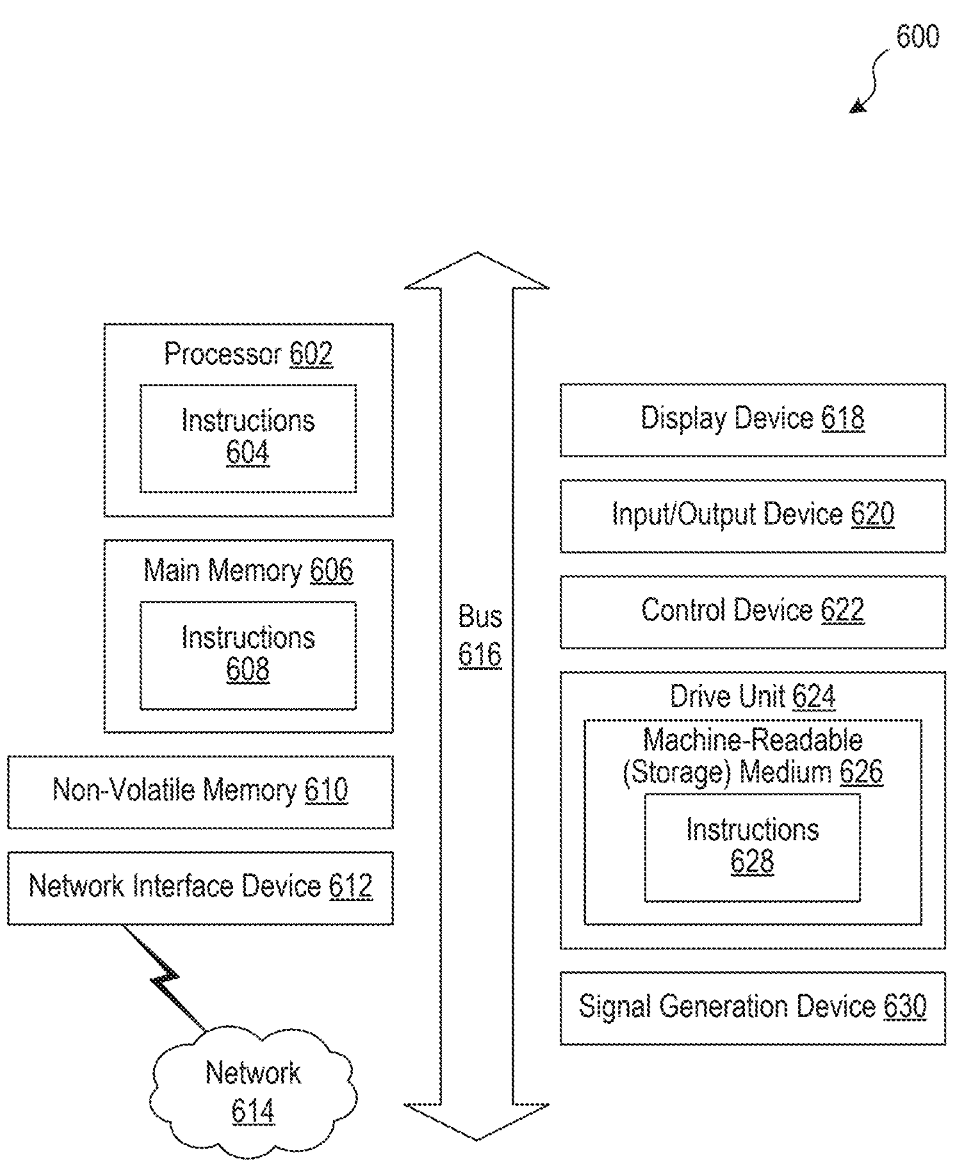
FIG. 6 is a block diagram that illustrates an example of a computer system in which at least some operations described herein can be implemented.

FIG. 6 is a block diagram that illustrates an example of a computer system 600 in which at least some operations described herein can be implemented. As shown, the computer system 600 can include: one or more processors 602, main memory 606, non-volatile memory 610, a network interface device 612, a display device 618, an input/output device 620, a control device 622 (e.g., keyboard and pointing device), a drive unit 624 that includes a machine-readable (storage) medium 626, and a signal generation device 630 that are communicatively connected to a bus 616. The bus 616 represents one or more physical buses and/or point-to-point connections that are connected by appropriate bridges, adapters, or controllers. Various common components (e.g., cache memory) are omitted from FIG. 6 for brevity. Instead, the computer system 600 is intended to illustrate a hardware device on which components illustrated or described relative to the examples of the figures and any other components described in this specification can be implemented.

The computer system 600 can take any suitable physical form. For example, the computer system 600 can share a similar architecture as that of a server computer, personal computer (PC), tablet computer, mobile telephone, wearable electronic device, network-connected ("smart") device (e.g., a television or home assistant device), augmented reality/virtual reality (AR/VR) system (e.g., head-mounted display), or any electronic device capable of executing a set of instructions that specify action(s) to be taken by the computer system 600. In some implementations, the computer system 600 can be an embedded computer system, a system-on-chip (SOC), a single-board computer (SBC) system, or a distributed system such as a mesh of computer systems or include one or more cloud components in one or more networks. Where appropriate, one or more computer systems 600 can perform operations in real time, near real time, or in batch mode.

The network interface device 612 enables the computer system 600 to mediate data in a network 614 with an entity that is external to the computer system 600 through any communication protocol supported by the computer system 600 and the external entity. Examples of the network interface device 612 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 606, non-volatile memory 610, machine-readable medium 626) can be local, remote, or distributed. Although shown as a single medium, the machine-readable medium 626 can include multiple media (e.g., a centralized/distributed database and/or associated caches and servers) that store one or more sets of instructions 628. The machine-readable medium 626 can include any medium that is capable of storing, encoding, or carrying a set of instructions for execution by the computer system 600. The machine-readable medium 626 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 610, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 604, 608, 628) set at various times in various memory and storage devices in computing device(s). When read and executed by the processor 602, the instruction(s) cause the computer system 600 to perform operations to execute elements involving the various aspects of the disclosure.

REMARKS

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," or any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the Detailed Description above using the singular or plural number may also include the plural or singular number, respectively. The word "or" in reference to a list of two or more items covers all of the following interpretations of the word: any of the items in the list, all of the items in the list, and any combination of the items in the list. The term “module” refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the Detailed Description above explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words “means for.” However, the use of the term “for” in any other context is not intended to invoke a similar interpretation. The applicant reserves the right to pursue such additional claim forms either in this application or in a continuing application.

The invention claimed is:

1. A non-transitory, computer-readable storage medium comprising instructions recorded thereon, wherein the instructions, when executed by at least one data processor of a system, cause the system to:

create a block within a digital workspace that includes multiple blocks, wherein the block is a discrete unit of content including text that is a conflict-free replicated data type (CRDT) instance that is assigned a text instance identifier (ID);

store a single text slice tree in a database record linked to the block, wherein the text slice tree has a hierarchical structure in which each node represents a text slice corresponding to a segment of the text, and wherein a database table stores the text instance ID for the text and a search label for each text slice including a parent search label for a root node, each search label including a string identifier;

in response to a text editing operation to split the text of the block:

segment the text into two contiguous text slices, represented as a first child node and a second child node in the text slice tree;

propagate the parent search label to both the first and second child nodes;

assign to the first child node a first child search label that comprises the parent search label as a prefix appended with a first character;

assign to the second child node a second child search label that comprises the parent search label as a prefix appended with a second character, the second character being different from the first character; and store the first and second child search labels in the database table, wherein a combination of the text instance ID and a particular search label for a particular node of the text slice tree uniquely identifies a corresponding particular text slice in the digital workspace, and wherein associations between search labels and their respective text slices are preserved throughout text editing operations performed on the text of the block.

2. The non-transitory, computer-readable storage medium of claim 1, wherein the text editing operation is a first text editing operation, and wherein the system is further caused to:

initiate a second text editing operation on a target location of the text of the block; and in response to the second text editing operation:

identify the text instance ID and a target search label of a target segment;

query the database table for any text slices matching the text instance ID and a target prefix of the target search label, wherein a set of matching text slices are retrieved for matching the target prefix and the target search label;

perform a search on the set of matching text slices to identify a particular text slice having a particular search label that contains the target prefix and a string identifier for the target search label; and apply the text editing operation to the particular text slice.

3. The non-transitory, computer-readable storage medium of claim 1, wherein each search label is encoded as a text string comprising printable ASCII characters using a bit-packing scheme that encodes multiple split operations performed on text per byte.

4. The non-transitory, computer-readable storage medium of claim 1, wherein the system is further caused to, in response to the text editing operation:

insert a split character at a position of a parent text slice where the parent text slice is to be split;

designate a sequence of characters from a start point of the parent text slice to the split character as a first child slice; and designate a sequence of characters from the split character to an end point of the parent text slice as a second child slice.

5. The non-transitory, computer-readable storage medium of claim 1, wherein the block is a first block, the text slice tree is a first text slice tree, and wherein the system is further caused to:

merge the first block with a second block by moving text slices from the first block to the second block while retaining respective search labels and text instance IDs of the moved text slices; and reparent the first text slice tree of the first block as a child node of a last text slice in a second text slice tree of the second block.

6. The non-transitory, computer-readable storage medium of claim 1, wherein the system is further caused to:

synchronize multiple text editing operations performed asynchronously, by distributed client instances, on the text of the block by using the text instance ID and search labels to search the database table to enable asynchronous collaborative editing without data loss.

7. The non-transitory, computer-readable storage medium of claim 1, wherein the system is further caused to:

while a client of the digital workspace is offline:

store one or more text editing operations performed at that client;

assign a provisional identifier to the one or more text editing operations as offline operations; and once the client of the digital workspace goes online after being offline:

synchronize the offline operations by using the provisional identifier and search labels to enable resolution of concurrent edits made by multiple clients while the client was offline.

8. The non-transitory, computer-readable storage medium of claim 1, wherein the system is further caused to:

store each search label of each text slice in the database table as metadata for the text slice, wherein the metadata includes format, attribution, originating block, version information, operational history, and a unique CRDT instance identifier.

9. The non-transitory, computer-readable storage medium of claim 1, wherein the system is further caused to:

determine an order of a set of text slices within the block based on respective search labels associated with the set of text slices; and render the block by displaying the text slices in accordance with the order.

10. A method comprising:

creating a block within a digital workspace that includes multiple blocks, wherein the block is a discrete unit of content including text that is a conflict-free replicated data type (CRDT) instance that is assigned a text instance identifier (ID);

storing a single text slice tree in a database record linked to the block, wherein the text slice tree has a hierarchical structure in which each node represents a text slice corresponding to a segment of the text, and wherein a database table stores the text instance ID for the text and a search label for each text slice including a parent search label for a root node, each search label including a string identifier;

in response to a text editing operation to split the text of the block:

segmenting the text into two contiguous text slices, represented as a first child node and a second child node in the text slice tree;

propagating the parent search label to both the first and second child nodes;

assigning to the first child node a first child search label that comprises the parent search label as a prefix appended with a first character;

assigning to the second child node a second child search label that comprises the parent search label as a prefix appended with a second character, the second character being different from the first character; and storing the first and second child search labels in the database table, wherein a combination of the text instance ID and a particular search label for a particular node of the text slice tree uniquely identifies a corresponding particular text slice in the digital workspace, and wherein associations between search labels and their respective text slices are preserved throughout text editing operations performed on the text of the block.

11. The method of claim 10, further comprising:

initiating a second text editing operation on a target location of the text of the block; and in response to the second text editing operation:

identifying the text instance ID and a target search label of a target segment;

querying the database table for any text slices matching the text instance ID and a target prefix of the target search label, wherein a set of matching text slices are retrieved for matching the target prefix and the target search label;

performing a search on the set of matching text slices to identify a particular text slice having a particular search label that contains the target prefix and a string identifier for the target search label; and applying the text editing operation to the particular text slice.

12. The method of claim 10, wherein each search label is encoded as a text string comprising printable ASCII characters using a bit-packing scheme that encodes multiple split operations performed on text per byte.

13. The method of claim 10, further comprising:

inserting a split character at a position of a parent text slice where the parent text slice is to be split;

designating a sequence of characters from a start point of the parent text slice to the split character as a first child slice; and designating a sequence of characters from the split character to an end point of the parent text slice as a second child slice.

14. The method of claim 10, wherein the block is a first block, the text slice tree is a first text slice tree, and the method further comprises:

merging the first block with a second block by moving text slices from the first block to the second block while retaining respective search labels and text instance IDs of the moved text slices; and reparenting the first text slice tree of the first block as a child node of a last text slice in a second text slice tree of the second block.

15. The method of claim 10, further comprising:

synchronizing multiple text editing operations performed asynchronously, by distributed client instances, on the text of the block by using the text instance ID and search labels to search the database table to enable asynchronous collaborative editing without data loss.

16. A system comprising:

at least one hardware processor; and at least one non-transitory memory storing instructions, which, when executed by the at least one hardware processor, cause the system to:

create a block within a digital workspace that includes multiple blocks, wherein the block is a discrete unit of content including text that is a conflict-free replicated data type (CRDT) instance that is assigned a text instance identifier (ID);

store a single text slice tree in a database record linked to the block, wherein the text slice tree has a hierarchical structure in which each node represents a text slice corresponding to a segment of the text, and wherein a database table stores the text instance ID for the text and a search label for each text slice including a parent search label for a root node, each search label including a string identifier;

in response to a text editing operation to split the text of the block:

segment the text into two contiguous text slices, represented as a first child node and a second child node in the text slice tree;

propagate the parent search label to both the first and second child nodes;

assign to the first child node a first child search label that comprises the parent search label as a prefix appended with a first character;

assign to the second child node a second child search label that comprises the parent search label as a prefix appended with a second character, the second character being different from the first character; and store the first and second child search labels in the database table, wherein a combination of the text instance ID and a particular search label for a particular node of the text slice tree uniquely identifies a corresponding particular text slice in the digital workspace, and wherein associations between search labels and their respective text slices are preserved throughout text editing operations performed on the text of the block.

17. The system of claim 16, wherein the system is further caused to:

initiate a second text editing operation on a target location of the text of the block; and in response to the second text editing operation:

identify the text instance ID and a target search label of a target segment;

query the database table for any text slices matching the text instance ID and a target prefix of the target search label, wherein a set of matching text slices are retrieved for matching the target prefix and the target search label;

perform a search on the set of matching text slices to identify a particular text slice having a particular search label that contains the target prefix and a string identifier for the target search label; and apply the text editing operation to the particular text slice.

18. The system of claim 16, wherein each search label is encoded as a text string comprising printable ASCII characters using a bit-packing scheme that encodes multiple split operations performed on text per byte.

19. The system of claim 16, wherein the system is further caused to, in response to the text editing operation:

insert a split character at a position of a parent text slice where the parent text slice is to be split;

designate a sequence of characters from a start point of the parent text slice to the split character as a first child slice; and designate a sequence of characters from the split character to an end point of the parent text slice as a second child slice.

* * * * *